(12) United States Patent
Carrender

(10) Patent No.: US 6,366,260 B1
(45) Date of Patent: Apr. 2, 2002

(54) RFID TAG EMPLOYING HOLLOWED MONOPOLE ANTENNA

(75) Inventor: Curtis L. Carrender, Richland, WA (US)

(73) Assignee: Intermec IP Corp., Woodland Hills, CA (US)

( * ) Notice: Subject to any disclaimer, the term of this patent is extended or adjusted under 35 U.S.C. 154(b) by 0 days.

(21) Appl. No.: 09/470,164

(22) Filed: Dec. 22, 1999

Related U.S. Application Data

(63) Continuation-in-part of application No. 09/430,158, filed on Oct. 29, 1999.
(60) Provisional application No. 60/106,743, filed on Nov. 2, 1998.

(51) Int. Cl.$^7$ .................................................. H01Q 7/00
(52) U.S. Cl. ........................ 343/866; 343/741; 343/702; 343/850; 340/572.7
(58) Field of Search ................................ 343/866, 873, 343/702, 700.4 S, 872, 850, 741, 742; 257/666, 735; 340/572.7, 507, 500, 540, 568.1, 572.1

(56) References Cited

U.S. PATENT DOCUMENTS

| | | |
|---|---|---|
| 3,685,050 A | 8/1972 | Cartwright |
| 4,150,382 A | 4/1979 | King |
| 4,782,345 A | 11/1988 | Landt |
| 4,816,839 A | 3/1989 | Landt |
| 4,853,705 A | 8/1989 | Landt |
| 5,012,256 A | 4/1991 | Maddocks |
| 5,241,701 A | 8/1993 | Andoh |
| 5,276,920 A | 1/1994 | Kuisma |
| 5,442,366 A | 8/1995 | Sanford |
| 5,786,626 A | 7/1998 | Brady et al. |
| 5,867,130 A | 2/1999 | Tay et al. |
| 5,874,919 A | 2/1999 | Rawnick et al. |
| 5,883,604 A | 3/1999 | Nicely |
| 5,929,760 A * | 7/1999 | Monahan .................. 340/572.8 |
| 6,052,062 A * | 4/2000 | Tuttle .................... 340/825.31 |
| 6,078,791 A * | 6/2000 | Tuttle et al. ................... 455/90 |
| 6,118,379 A * | 9/2000 | Kodukula et al. ........ 340/572.8 |

OTHER PUBLICATIONS

"Horizontal Antennas Above Real Ground" By Ralph Holland, Amateur Radio, vol. 64, No. 10, Oct. 1996, Journal of the Wireless Institute of Australia; Dynamite.com—pp. 1–4.
"Horizontal Half–Wave Dipole Above a Conterpoise" By Ralph Holland, Amateur Radio, vol. 64, No. 11, Nov. 1996, Journal of the Wireless Institute of Australia; Dynamite.com—pp. 1–4.

* cited by examiner

*Primary Examiner*—Don Wong
*Assistant Examiner*—Ephrem Alemu
(74) *Attorney, Agent, or Firm*—O'Melveny & Myers LLP

(57) ABSTRACT

A radio-frequency identification (RFID) transponder (tag) in accordance with the principles of the invention includes a hollowed monopole antenna. The hollowed monopole antenna is co-located on a substrate with RFID circuitry and a quarter wave transformer. The quarter wave transformer acts as a reference for the RFID circuitry. The monopole antenna may have a trapezoidal shape, such as triangular or rectangular, that increases the effective electrical length of the antenna without increasing its overall surface area.

18 Claims, 2 Drawing Sheets

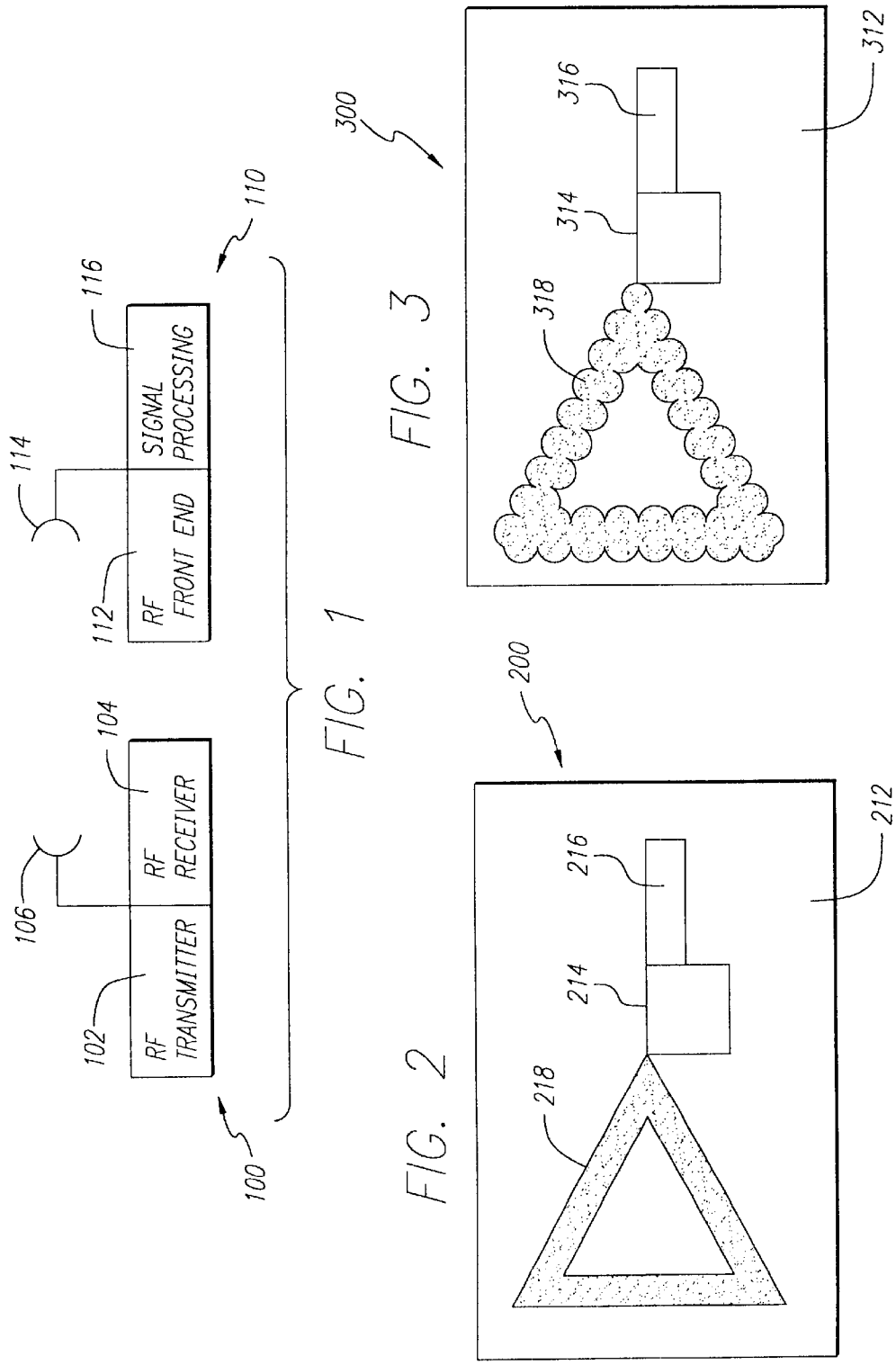

RFID TAG EMPLOYING HOLLOWED MONOPOLE ANTENNA

RELATED APPLICATION DATA

This application is a continuation-in-part of co-pending application Ser. No. 09/430,158, filed Oct. 29, 1999, which claims priority pursuant to 35 U.S.C. § 119(e) to provisional application Ser. No. 60/106,743, filed Nov. 2, 1998.

BACKGROUND OF THE INVENTION

1. Field of the Invention

The present invention relates to radio frequency identification (RFID) tags, and more particularly, to RFID tags that employ monopole antennas.

2. Description of Related Art

Radio Frequency Identification (RFID) transponders (tags) are operated in conjunction with RFID base stations for a variety of inventory-control, security and other purposes. Typically an item having a tag associated with it, for example, a container with a tag placed inside it, is brought into a "read zone" established by the base station. The RFID base station transmits an interrogating RF signal that is modulated by a receiving tag. That is, the RFID base station generates a continuous wave electromagnetic disturbance at a carrier frequency and this disturbance is modulated to correspond to data that is to be communicated via the disturbance. The modulated disturbance, or signal, communicates the information at a rate, referred to as the data rate, which is lower than the carrier frequency. The receiving tag modulates the RF signal in order to impart to the signal information stored within the tag and then transmits the modulated, answering, RF signal to the base station.

RFID tags may be active, containing their own RF transmitter, or passive, having no transmitter. Passive tags, i.e., tags that rely upon modulated back-scattering to provide a return link to an interrogating base station, may include their own power sources, such as a batteries, or they may be "field-powered", whereby they obtain their operating power by rectifying an interrogating RF signal. Although both battery-powered and field-powered tags have minimum RF field strength read requirements, or read thresholds, in general, the range of a field-powered passive system or tag is limited by the amount of radiated power supplied from the reader and the range of a tag having its own power source is limited by the signal to noise level of the total communications link. Because the interrogating signal must provide power to a field-powered passive tag, the read threshold for a field-powered passive tag is typically substantially higher than for an active tag. However, because field-powered passive tags do not include their own power source, they may be substantially less expensive than active tags and because they have no battery to "run down", field-powered passive tags may be more reliable in the long term than active tags. And, because they do not include a battery, field-powered passive tags are typically much more "environmentally-friendly".

Although field-powered passive tag RFID systems provide cost, reliability, and environmental benefits, there are obstacles to the efficient operation of field-powered passive tag RFID systems. In particular, it is often difficult to deliver sufficient power from a base station to a field-powered passive tag via an interrogating signal. The amount of power a base station may impart to a signal is limited by a number of factors, not the least of which is regulation by the Federal Communication Commission (FCC). An RFID tag may employ a resonant antenna in order to best utilize the signal power available to it. Unfortunately, a resonant antenna may require a good deal more area than is available to an RFID tag in many applications.

Consequently, it would be highly advantageous to provide an RFID tag that is compact, light weight, low cost and that efficiently employs a substantial portion of the signal energy which it receives from an interrogating base station.

SUMMARY OF THE INVENTION

A radio-frequency identification (RFID) transponder (tag) in accordance with the principles of the invention includes a monopole antenna that is "hollowed out" to extend the electrical length of the antenna. In this manner, an antenna having a given electrical length may be formed within a much more compact area than a conventional antenna.

In an illustrative embodiment of the invention, an RFID tag employs an antenna formed of conductive material deposited or plated on a substrate and having generally triangular-shaped interior and exterior perimeters. The electrical length of the thus-formed antenna is significantly greater than that of a solid triangular shaped antenna having the same overall "footprint". Because the removal of interior conductive material tends to reduce the efficiency of the antenna (when compared with its continuous conductive sheet counterpart), the amount of interior conductive material removed may be limited to that amount which yields a predetermined antenna efficiency. Further increases in the electrical length and, consequently, reduction in overall antenna area, may be achieved by curving one or both of the antenna perimeters into generally scalloped or serpentine shapes.

In another aspect of the invention, all components of the tag may be situated on one side of a substrate, with a quarter wave stub acting as a reference. In an illustrative embodiment, the RFID tag includes a substrate material, such as a rigid material such as glass, ceramic, or printed circuit board material, or a thin, flexible material, such as organic materials such as polyimide or paper, or plastic, having an integrated circuit (tag IC) mounted on one surface of the substrate. The tag IC includes RFID tag electronics and may be thinned by grinding, etching, or polishing away a portion of the tag IC's substrate material. The tag IC is connected at one terminal to the new hollowed monopole antenna and at another terminal to a quarter wave transformer, which operates as a reference. The resulting RFID tag is simple, inexpensive, compact, and, since a resonant antenna is employed, highly efficient.

A more complete understanding of the RFID tag employing a hollowed monopole antenna will be afforded to those skilled in the art, as well as a realization of additional advantages and objects thereof, by a consideration of the following detailed description of the preferred embodiment. Reference will be made to the appended sheets of drawings which will first be described briefly.

BRIEF DESCRIPTION OF THE DRAWINGS

The above and further features, aspects, and advantages of the invention will be apparent to those skilled in the art from the following detailed description, taken together with the accompanying drawings in which:

FIG. 1 is a conceptual block diagram of a RFID system including a base station and an RFID tag having an antenna in accordance with the principles of the invention;

FIG. 2 is a top plan view of an RFID tag that includes a hollowed monopole antenna in accordance with an embodiment of the present invention;

FIG. 3 is top plan view of an RFID tag that includes a hollowed monopole antenna having curved perimeters in accordance with another embodiment of the present invention;

DETAILED DESCRIPTION OF THE PREFERRED EMBODIMENT

Figure 4:
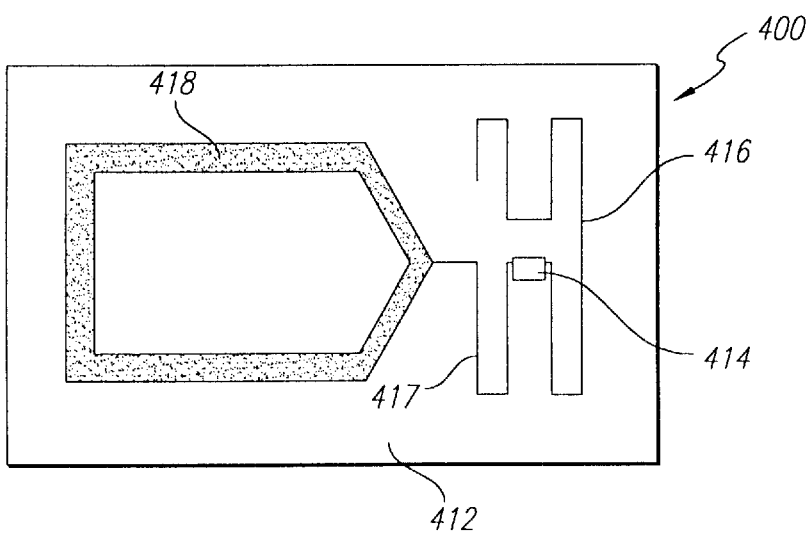
FIG. 4 is a top plan view of an RFID tag that includes a hollowed monopole antenna having a trapezoidal shape in accordance with another embodiment of the present invention.

A radio-frequency identification (RFID) transponder (i.e., tag) constructed in accordance with the principles of the invention includes a monopole antenna that is hollowed out to extend the electrical length of the antenna, thereby permitting a resonant antenna to be manufactured in a relatively constricted area. The antenna may be formed of conductive material deposited or plated in a form having generally triangular, rectangular or other trapezoidally shaped interior and exterior perimeters and one or both of the perimeters may be curved to further extend the electrical length of the antenna.

An RFID system in accordance with the principles of the present invention is illustrated in the conceptual block diagram of FIG. 1. A base station 100 includes an RF transmitter 102, an RF receiver 104, and an antenna 106 connected to the transmitter 102 and receiver 104. An RFID tag 110 such as may be used in conjunction with the base station 100 includes an RF front end 112, a signal processing section 116, and a hollowed monopole antenna 114. The hollowed monopole antenna 114 permits the RFID tag to be both compact and inexpensive, as will be further described below. The RFID tag 110 may further include a memory (not shown) in which data may be stored, retrieved and/or rewritten.

In operation, the base station 100 interrogates the tag 110 by generating an RF signal having a carrier frequency $F_c$. The carrier frequency $F_c$ is chosen based on a number of factors known in the art, including the amount of power permitted at that frequency by FCC regulations. The RF signal is coupled to the antenna 106 and transmitted to the tag 110. The RF signal emitted by the antenna 106 will, ostensibly, be received by the tag antenna 114 if the tag 110 is within the transmitting range of the base station 100. If the field strength of the RF signal satisfies a predetermined a read threshold requirement, the RF tag 110 will respond to the reception of the signal by modulating the RF carrier to impart information about the tag onto the back-scattered RF field, which propagates to the base station 100. The RF signal transmitted by the base station 100 must have sufficient field strength, taking into account the polarization of the signal and of the antenna 114 of the RF tag 110 for the tag to detect the RF signal. In the case of a field-powered passive tag, the field strength of the interrogating signal generally must be large enough for the tag 110 to rectify the signal and to use the energy of the RF signal as a power source for the tag.

Turning now to FIG. 2, an illustrative embodiment of an RFID tag 200 in accordance with the principles of the present invention is shown in a top plan view. The RFID tag 200 includes a hollowed monopole antenna 218 laminated onto a substrate 212. The tag IC 214 is connected at one terminal to the antenna 218 and, at another, to a transformer 216 that operates as the tag reference. The length of the transformer 216 is ideally chosen to be approximately one quarter the guided wavelength in the line at the carrier frequency of the base station interrogating signal. The tag IC 124 incorporates the RF front end 110 and signal processing 112 functions discussed above in relation to FIG. 1. The tag IC 124 may be implemented with any of a variety of package styles but is, in the illustrative embodiment, packaged in a mini small outline package (MSOP) and is mounted directly to the circuit board 120 and connected in a conventional manner to the impedance matching circuit 122. An example of such "surface mounting" of IC packages is described in U.S. Pat. No. 5,528,222, entitled "Radio Frequency Circuit and Memory in Thin Flexible Package", issued Jun. 18, 1996 to Moskowitz et al., which is incorporated by reference herein. With all the tag components located on one side of a substrate, a completely via-free RFID tag may be produced, with the attendant benefits of low manufacturing costs and high mechanical reliability.

The substrate 212 may be composed a flexible material, such as an organic material like polyimide or polyester, or a less flexible material such as ceramic, glass or a glass fabric impregnated with a resin (usually epoxy) generally used in the fabrication of printed circuit boards (e.g., FR4). The antenna 218 may be comprised of a material having sufficiently high electrical conductivity, such as a metallic material comprising copper (Cu) or aluminum (Al), or a microwave conductive carbon fiber. As known in the art, the antenna 218 may be patterned utilizing a photolithographic, ion etching, chemical etching, or vapor deposition process. RFID circuitry, in the form of a tag IC 214 in this illustrative embodiment, is mounted on the same side of the substrate 212 as the hollowed monopole antenna 218. For particularly cost-sensitive applications, the antenna 218 may be printed onto very inexpensive substrate materials, such as paper or plastic, using conductive inks to form an extremely inexpensive RF tag.

As shown in FIG. 2, the antenna 218 has generally triangular-shaped interior and exterior perimeters. The electrical length of the thus-formed antenna is significantly greater than that of a solid triangular shaped antenna having the same overall "footprint". For example, an RFID tag operating at 915 MHz may require a solid triangular antenna that is six inches long in its longest dimension in order to provide the high efficiency of resonant operation. In contrast, a hollowed triangular antenna such as the antenna 218 of FIG. 2 having a longest dimension of only three inches may provide resonant operation with substantially the same performance level as that of the six inch solid triangular antenna.

Not only does the transformer 216 operate as a reference for the tag, the antenna 218 and the transformer 216 may operate as complementary antennas to provide multiple frequency operation. For example, at a 915 MHz carrier frequency, the antenna 218 operates as previously described, and the transformer 216 operates as a reference. The same tag 200 may be operated at a 2.45 GHz carrier frequency, in which case the transformer 216 operates as the tag antenna and the antenna 218 operates as the tag reference. Because the removal of interior conductor tends to reduce the efficiency of the antenna when compared with its continuous conductive sheet counterpart, the amount of interior conductor removed may be limited to that amount which yields a predetermined level of antenna efficiency.

In practice, to achieve optimum multiple frequency operation, it may be necessary to increase the length of the transformer 216 to greater than one quarter of the guided wavelength. The impedance of the tag IC 214, the phase shift of the tag impedance during conduction, and the reception of RF energy by the transformer 216 unique from that received from the antenna 218 are each factors in determining the actual length of the transformer. It should be appreciated that other lengths of the transformer 216 can yield similar, if somewhat less efficient results. For example, in some multiple frequency applications, a three quarter wavelength transformer may be optimal.

Referring now to FIG. 3, an alternative RFID tag 300 includes an antenna 318 having a hollowed monopole structure similar to that of FIG. 2. The hollowed monopole antenna 318 is laminated onto a substrate 312, and a tag IC 314 is connected at one terminal to the antenna 318 and, at another, to a transformer 316 that operates as the tag reference. The antenna 318, the tag IC 314, and the transformer 316 are illustratively affixed to the same side of a substrate material 312. The antenna 318 has a generally triangular shape similar to the antenna 218 of FIG. 2, but achieves a further increase in electrical length and, consequently, reduction in overall antenna area, by providing outside and inside perimeter edges with a generally scalloped or serpentine shape. This permits the overall dimensions of the RFID tag 300 to be reduced even further.

Referring now to FIG. 4, another alternative RFID tag 400 includes an antenna 418 having a hollowed monopole structure having a trapezoidal shape. The hollowed monopole antenna 418 is laminated onto a substrate 412, and a tag IC 414 is connected at one terminal to the antenna 418 and, at another, to a transformer 416 that operates as the tag reference. The antenna 418, the tag IC 414, and the transformer 416 are illustratively affixed to the same side of a substrate material 412. A conductive trace 417 couples the tag IC 414 to the antenna 418, and a second conductive trace 416 provides the transformer. More particularly, the antenna 418 comprises a five-sided structure having three sides that are generally rectangular, and two additional sides closely adjacent to the tag IC 414 that form an angle. The antenna 418 and substrate 412 may be formed in the same manner as described above. The conductive traces 416, 417 may be formed in the same manner as the antenna 418. An application for the RFID tag 400 of FIG. 4 is to provide a label or sticker. The substrate 412 may thereby be paper or plastic material with the antenna 418 and conductive traces 417, 416 provided by conductive ink or copper foil.

Figure 5:
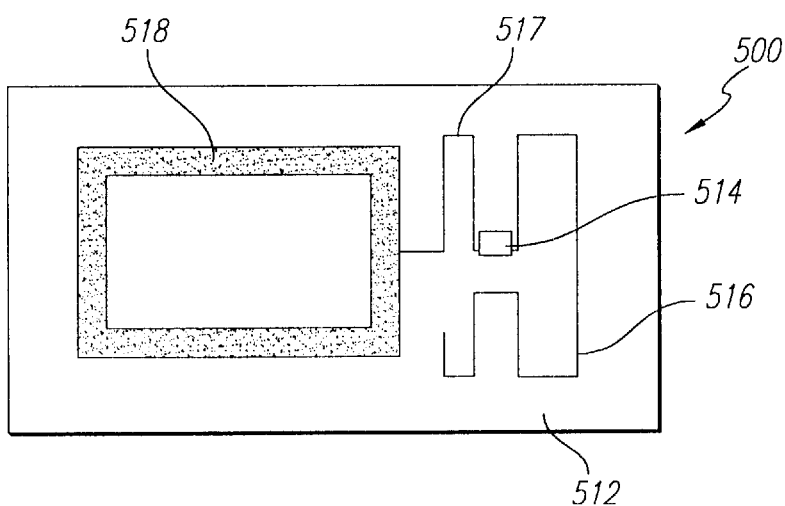
FIG. 5 is a top plan view of an RFID tag that includes a hollowed monopole antenna having a trapezoidal shape in accordance with another embodiment of the present invention.

Referring now to FIG. 5, another alternative RFID tag 500 includes an antenna 518 having a hollowed monopole structure having a rectangular shape. The hollowed monopole antenna 518 is laminated onto a substrate 512, and a tag IC 514 is connected at one terminal to the antenna 518 and, at another, to a transformer 516 that operates as the tag reference. The antenna 518, the tag IC 514, and the transformer 516 are illustratively affixed to the same side of a substrate material 512. A conductive trace 517 couples the tag IC 514 to the antenna 518, and a second conductive trace 416 provides the transformer. An anticipated application for the RFID tag 500 of FIG. 5 is to provide a durable tag for use on a pallet. The substrate 512 may thereby be a rigid material such as FR-4 with the antenna 518 and conductive traces 516, 517 provided by copper material in the same manner as described above.

Figure 6A:
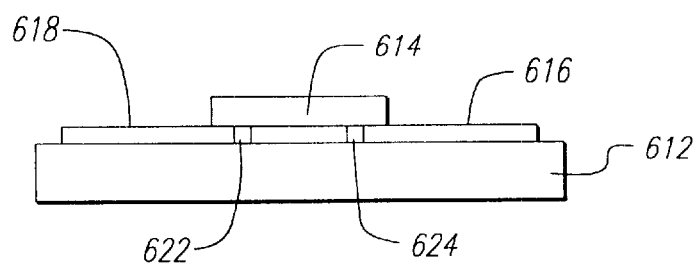
FIGS. 6A and 6B are elevation views of RFID tags constructed in accordance with the principles of the present invention.
Figure 6B:
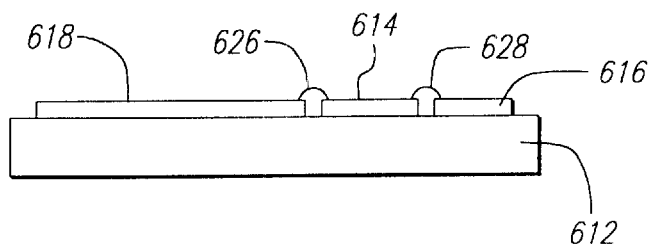

The elevation views of FIGS. 6A and 6B illustrate two of the many ways in which an antenna, tag IC, and transformer may be affixed to a substrate layer. In FIG. 6A, the substrate 612 has printed traces formed thereon that comprise the antenna 618 and the quarter wave transformer 616. The tag IC 614 is mounted to the substrate 612 partially covering the printed traces forming a portion of the antenna 618 and the transformer 616. An electrical connection is formed between the terminals of the tag IC 614 and the antenna 618 and the transformer 616 through solder joints or conductive epoxy 622, 624, respectively. In FIG. 6B, the electrical connections between the tag IC 614 and the antenna 618 and transformer 616 are made using wire bonds 626, 628, respectively. Other known attachment techniques may also be utilized, such as flip-chip attachment.

The foregoing description of specific embodiments of the invention has been presented for the purposes of illustration and description. It is not intended to be exhaustive or to limit the invention to the precise forms disclosed, and many modifications and variations are possible in light of the above teachings. The advantages of a hollowed shape may be applied to any of a number of familiar monopole antenna shapes. The embodiments were chosen and described to best explain the principles of the invention and its practical application, and to thereby enable others skilled in the art to best utilize the invention. It is intended that the scope of the invention be limited only by the claims appended hereto.

Having thus described a preferred embodiment of an RFID tag employing a hollowed monopole antenna, it should be apparent to those skilled in the art that certain advantages of the aforementioned system have been achieved. It should also be appreciated that various modifications, adaptations, and alternative embodiments thereof may be made within the scope and spirit of the present invention. The invention is further defined by the following claims.

What is claimed is:

1. An RF tag comprising:
   a substrate;
   an RF integrated circuit affixed to a first side of said substrate; and
   a hollowed monopole antenna affixed to said first side of the substrate and connected to a terminal of the RF integrated circuit, wherein said hollowed monopole antenna comprises a planar surface having interior and exterior perimeter edges.

2. An RF tag comprising:
   a substrate;
   an RF integrated circuit affixed to a first side of said substrate;
   a hollowed monopole antenna affixed to said first side of the substrate and connected to a terminal of the RF integrated circuit, wherein said hollowed monopole antenna comprises a planar surface having interior and exterior perimeter edges; and
   a transformer affixed to said first side of said substrate and to a second terminal of said integrated circuit.

3. The RF tag of claim 2, wherein said transformer has a length approximately equal to one quarter of a guided wavelength of an operative frequency of said RF tag.

4. An RF tag comprising:
   a substrate;
   an RF integrated circuit affixed to a first side of said substrate; and
   a hollowed monopole antenna affixed to said first side of the substrate and connected to a terminal of the RF integrated circuit, wherein said monopole antenna comprises a planar surface having interior and exterior perimeter edges having a generally polygonal shape.

5. The RF tag of claim 2, wherein at least one of the interior and exterior perimeter edges are curved.

6. The RF tag of claim 4, wherein said polygonal shape further comprises a triangle.

7. The RF tag of claim 4, wherein said polygonal shape further comprises a rectangle.

8. The RF tag of claim 1, wherein said substrate is comprised of a material including at least one of polyimide, polyester, fiberglass, ceramic, plastic, and paper.

9. The RF tag of claim 1, wherein said antenna is comprised of a material including at least one of copper, aluminum and conductive ink.

10. An RFID communication system comprising:

a base station having a receiver and a transmitter; and an RFID tag adapted to communicate with the base station, the RFID tag including a substrate, an RF integrated circuit affixed to a first side of said substrate, and a hollow monopole antenna affixed to said first side of the substrate and connected to a terminal of the integrated circuit, wherein said hollowed monopole antenna comprises a planar surface having interior and exterior perimeter edges.

11. An RFID communication system comprising:

a base station having a receiver and a transmitter;

an RFID tag adapted to communicate with the base station, the RFID tag included a substrate, an RF integrated circuit affixed to a first side of said substrate, and a hollowed monopole antenna affixed to said first side of the substrate and connected to a terminal of the integrated circuit, wherein said hollowed monopole antenna comprises a planar surface having interior and exterior perimeter edges; and a transformer affixed to said first side of said substrate and to a second terminal of said integrated circuit.

12. The RFID communication system of claim 11, wherein said transformer has a length approximately equal to one quarter of a guided wavelength of an operative frequency of said RF tag.

13. An RFID communication system comprising:

a base station having a receiver and a transmitter; and an RFID tag adapted to communicate with the base station, the RFID tag including a substrate, an RF integrated circuit affixed to a first side of said substrate, and a hollowed monopole antenna to said first side of the substrate and connected to a terminal of the integrated circuit, wherein said monopole antenna comprises a planar surface having interior and exterior perimeter edges having a polygonal shape.

14. The RFID communication system of claim 13, wherein at least one of the interior and exterior perimeter surfaces are curved.

15. The RFID communication system of claim 13, wherein said polygonal shape comprises a triangle.

16. The RFID communication system of claim 13, wherein said polygonal shape comprises a rectangle.

17. The RFID communication system of claim 10, wherein said substrate is comprised of a material including at least one of polyimide, polyester, fiberglass, ceramic, plastic, and paper.

18. The RFID communication system of claim 10, wherein said antenna is comprised of a material including at least one of copper, aluminum and conductive ink.

* * * * *